United States Patent
Pinnow

(10) Patent No.: US 7,448,317 B2
(45) Date of Patent: Nov. 11, 2008

(54) METHOD FOR THE OPERATION OF A FILTER PRESS COMPRISING A RAM

(75) Inventor: Dieter Pinnow, Ehrendingen (CH)

(73) Assignee: Bucher Guyer AG, Niederweningen (CH)

( * ) Notice: Subject to any disclaimer, the term of this patent is extended or adjusted under 35 U.S.C. 154(b) by 46 days.

(21) Appl. No.: 11/596,421

(22) PCT Filed: Apr. 8, 2005

(86) PCT No.: PCT/CH2005/000202

§ 371 (c)(1),
(2), (4) Date: Nov. 10, 2006

(87) PCT Pub. No.: WO2005/108049

PCT Pub. Date: Nov. 17, 2005

(65) Prior Publication Data

US 2007/0227371 A1    Oct. 4, 2007

(30) Foreign Application Priority Data

May 10, 2004   (CH) .................................... 822/04

(51) Int. Cl.
  *B30B 9/04*    (2006.01)
  *B30B 15/20*   (2006.01)
(52) U.S. Cl. ............................ 100/37; 100/49; 100/107
(58) Field of Classification Search .................. 100/37, 100/48, 49, 50, 104, 107, 110, 125, 126, 100/127, 211; 99/486, 495; 426/478, 489
See application file for complete search history.

(56) References Cited

U.S. PATENT DOCUMENTS

| 5,146,848 | A | * | 9/1992 | Dufour ........................ 100/345 |
| 5,579,683 | A | | 12/1996 | Hartmann |
| 5,613,434 | A | | 3/1997 | Hartmann |
| 5,622,103 | A | * | 4/1997 | Acosta et al. ............. 100/70 R |

FOREIGN PATENT DOCUMENTS

DE          197 15 157        10/1998

OTHER PUBLICATIONS

Search Report dated Jun. 27, 2005 for the underlying International Application No. PCT/CH2005/000202.

* cited by examiner

*Primary Examiner*—Jimmy T Nguyen
(74) *Attorney, Agent, or Firm*—Cohen Pontani Lieberman & Pavane LLP

(57) ABSTRACT

A method of operating a filter press for solid-liquid separation of a product, the filter press comprising a press jacket with an end, and a ram in the press jacket and movable relative to the end to define a pressing space. The method comprising loading a product to be pressed in the pressing space; positioning the ram in a start position so that the product only partially fills the pressing space; advancing the ram, during a first phase of a forward movement, from the start position to a full contact position where the volume of the pressing space becomes equal to a volume of the product; and advancing the ram toward the end from the full contact position during a second phase of the forward movement, the ram exerting no pressure on the product during the first phase but exerting pressure on the product during the second phase to press liquid phase out of the product. At the full contact position, the ram is advanced at a forward velocity lower than an average forward velocity over the first phase.

26 Claims, 5 Drawing Sheets

METHOD FOR THE OPERATION OF A FILTER PRESS COMPRISING A RAM

CROSS-REFERENCE TO RELATED APPLICATIONS

This is a U.S. national stage of International Application No. PCT/CH2005/000202, filed on 8 Apr. 2005. Priority is claimed on Switzerland Application No. 822/04, filed on 10 May 2004.

BACKGROUND OF THE INVENTION

1. Technical Field

The invention pertains to a method for operating a filter press for the solid-liquid separation of a product with a pressing space containing a ram, to an application of the method, to a filter press for implementing the method, and to an application of the filter press according to the introductory clauses of the independent claims.

2. Description of the Related Art

Filter presses with a ram are used especially in the food industry, e.g., in the production of fruit juices. The ground-up fruit pulp is introduced into the pressing space and then subjected to pressure by the forward movement of the ram. The liquid phase is conducted away through filter drainage elements, and the solid phase remains behind in the pressing space. Because, for reasons of process technology, the available pressing space is not completely filled with pulp, the ram moves forward during a first phase without actually exerting any pressure on the pulp; the volume of the pressing space is simply reduced until it matches the quantity of pulp present in the pressing space. After the volume of the pressing space has become equal to the volume of the pulp, the ram executes the second phase of its forward movement, in which it exerts pressure on the pulp to squeeze liquid phase out of it. During the first phase of the forward movement, only weak feed forces are necessary, but at the same time it is desirable to use the highest possible forward velocity. During the second phase, conversely, strong feed forces are necessary at a relatively low forward velocity. For this reason, hydraulic cylinders and hydraulic pumps which can switch from one setting to another are used almost exclusively today to drive the ram. Thus a high volume flow rate of hydraulic fluid can be supplied to the hydraulic cylinder at low pressure during the first phase of the forward movement, and a low volume flow rate can be supplied at high pressure during the second phase. The switchover is easily accomplished by increasing the pressure in the hydraulic circuit when the ram makes full contact with the pulp filling the pressing space. The existing method, however, does not allow for any further increase in the forward velocity, even though this would be advisable from an economic standpoint. The velocity is not increased, however, because, if it were, the resulting increase in the pressure peak in the pressing space which occurs when the ram makes full contact with the pulp would interfere with the formation of a desirable secondary filtering layer on the filter drainage elements, and thus an increased amount of suspended solids would be introduced into the squeezed-out liquid phase.

SUMMARY OF THE INVENTION

The problem is therefore to make available a method for operating a filter press and a filter press which do not suffer from the disadvantages of the state of the art or which at least minimize these disadvantages.

This problem is solved by the method and by the filter press of the present invention.

A first aspect of the invention pertains to a method for operating a filter press with a pressing space and a ram for the solid-liquid separation of a preferably organic, liquid-to-pasty product. In a first step of the method, the filter press is prepared by loading the product to be subjected to solid-liquid separation into the pressing space and by moving the ram back to a rear position. In this situation, the volume of the quantity of product present in the pressing space is considerably smaller than the volume of the pressing space. In this first step of the method, the pressing space is therefore only partially filled with product; the degree to which the space is filled in this operating situation is therefore less than 1. In the following second step, the ram is moved forward from the rear position, thus reducing the volume of the pressing space, until it makes full contact with the product present in the pressing space. This full contact occurs when the volume of the pressing space has become equal to the volume of the product in the pressing space. In this first phase of its forward movement, the ram exerts essentially no pressure on the product. When the ram is now moved forward during the second phase, after the volume of the pressing space has become equal to the volume of the product in the pressing space, it will thus exert pressure on the product and squeeze liquid phase out of it. At the moment when the volume of the pressing space and the volume of the product in the pressing space become equal, i.e., at the moment when the ram makes full contact with the product at the end of the first phase, the ram is advanced at a forward velocity which is lower than the average forward velocity averaged over the first phase of its forward movement. Over most of the first phase of the forward movement of the ram, during which the ram exerts essentially no pressure on the product in the pressing space, the ram travels much faster than it does at the end of this phase and/or at the beginning of the following, second phase of the forward movement, during which the pressure begins to build up in the pressing space. As a result, the ram contacts the product at a velocity which is lower than the average forward velocity of the first phase, and thus the pressure in the pressing space increases gradually, without any pronounced peak, which is desirable.

Through the inventive operating method with a forward velocity in the first phase of ram movement which is much higher than that according to the state of the art, it is possible to achieve higher processing outputs without increasing the amount of suspended solids in the squeezed-out liquid phase. Thus a qualitatively equivalent product can be obtained at lower cost.

In a preferred exemplary embodiment of the method, the forward velocity of the ram during the first phase of its forward movement is decreased in stages or continuously from a maximum forward velocity to the forward velocity present when the ram makes full contact with the product. This reduction in velocity is preferably carried out in accordance with a predetermined forward velocity profile, which can be fixed or predetermined as a function of certain process parameters such as the amount of product actually in the pressing space and/or on the properties of the product. In the case of presses with a ram which is advanced in a horizontal plane, it is also provided that the forward velocity during the first phase of forward movement until the ram makes full contact with the product is controlled as a function of the required forward-feed force in such a way that the forward velocity is decreased as the forward-feed force increases as a result of the compression of the product in the pressing space. As a result, it easy to realize a self-regulating action during the first phase of the forward movement.

The ram is preferably advanced initially from the rear starting position at a first forward velocity to a predetermined first position in which the pressing space is still only partially filled with product and in which the ram therefore is not yet in full contact with the product. Starting from this first position, the ram is then advanced at a second forward velocity to a second position, at which the volume of the pressing space is equal to that of the product in the pressing space and the ram begins to exert pressure on the product in the pressing space. The second forward velocity is lower than the first forward velocity. As a result, the ram, during its forward movement between the first and the second position, contacts the product at the lower second velocity and then starts to exert pressure on it, with the result that liquid phase begins to be squeezed out of the product. This method offers the advantage that it can be realized with low-cost switchable hydraulic drives for the ram and is therefore also suitable for the operation of already existing filter presses.

It is also preferable for the first position to be predetermined in such a way that, when it is reached, the pressing space is filled to a specific degree or that the ram is a specific distance away from the position in which the volume of the pressing space and the volume of the product in the pressing space are equal, i.e., the position in which the ram therefore makes full contact with the product. As a result, it is possible to switch to the lower second forward velocity just before the ram makes full contact with the product, so that minimal ram travel times are obtained and it is ensured simultaneously that the ram makes full contact with the product at the lower second forward velocity.

It is also preferable for the ram to be advanced during the second phase of the forward movement at the second forward velocity until a predetermined pressure is reached in the pressing space. As a result, it is possible to achieve an almost seamless transition between the initial phase and the actual squeezing process.

In another preferred embodiment of the method, before the ram is advanced, i.e., before the ram is advanced during a pressing cycle, the ram is used to perform a preceding pressing cycle in which liquid phase is squeezed from the product. So that the forward velocity profile—and, in the case of graduated velocity profiles, the first position—can be predetermined, the position of the ram at the end of the previously completed pressing operation is determined. On the basis of this determined position and additional knowledge concerning the amount of product, wash-out liquid, or liquid product phase which may have been added or removed after the end of the preceding pressing cycle, it is then possible to establish in advance the probable position which the ram will assume when it makes full contact with the product present in the pressing space and to adapt the forward velocity profile correspondingly. This makes the method especially suitable for pulsed filling operations with intermediate squeezing-out of liquid phase or for interval-wise pressing with intermediate loosening of the product and possibly the additional introduction of washing fluid to the pressing space. In addition to establishing the position of the ram at the end of the previously completed pressing cycle, it is also possible to determine the pressure m the pressing space at the time when the ram reaches this position and to use this recorded pressure value as well to establish the probable position of the ram when it makes full contact with the product in the pressing space or to adjust the forward velocity profile so that changes in the compressibility of the pulp, for example, can be taken into account.

It is preferred accordingly to supply additional product or wash fluid to the pressing space during the time between the end of the preceding pressing cycle and the moment at which the volume of the pressing space and the volume of the product in the pressing space become equal, i.e., when the method is therefore being used in conjunction with pulsed filling mode or wash-out mode. Here the advantages of the inventive method become especially obvious.

It is also preferable to determine the quantity of product or wash fluid supplied to the pressing space as a basis for predetermining the associated forward velocity profile and also, in the case of a graduated velocity profile, as a basis for predetermining the first position, so that each individual pressing operation can be optimized.

In yet another preferred embodiment of the method, the forward velocity of the ram during the second phase of its forward movement is regulated in such a way that a certain pressure curve is followed while liquid phase is being squeezed out in the pressing space as soon as a certain pressure is reached in the pressing space or as soon as the ram reaches a certain position.

It is advantageous in this case to select a pressure curve specifically for the product to be pressed and/or as a function of the actual runoff of liquid phase, because it is thus possible to achieve optimal pressing results.

In yet another preferred embodiment of the method, the method is implemented with a filter press in which a plurality of flexible filter drainage elements is installed between the ram and the other boundaries of the pressing space to allow the liquid phase of the product to leave the pressing space during the pressing cycle while simultaneously holding back the solid phase in the pressing space. Such presses are especially suitable for operation according to the inventive method.

A second aspect of the invention pertains to an application of the method according to the first aspect of the invention to the solid-liquid separation of fruit or vegetable pulps. In this application, the advantages of the invention become especially evident.

A third aspect of the invention pertains to a filter press with a pressing space for holding a product to be pressed, with a ram in the pressing space for exerting pressure on the product, and with a press control unit, which makes it possible to operate the press, preferably automatically, according to the method covered under the first aspect of the invention.

In a preferred embodiment of the filter press, the press control unit is able to control the forward movement of the ram, which starts from a rear position in a pressing space not completely filled with product, in such a way that the ram, starting from the rear position, moves forward in a first phase during which it does not exert any pressure on the product but does decrease the volume of the pressing space until it is equal to the volume of the product in the pressing space and then, in a second phase of its forward movement, exerts pressure on the product to squeeze liquid phase from it, where, at the time that the volume of the pressing space becomes equal to the volume of the product in the pressing space, the ram has a forward velocity which is lower than the average forward velocity averaged over the first phase of its forward movement. This can be accomplished by implementing certain fixed or variable, continuous or graduated forward velocity profiles. The drives used for continuous forward velocity profiles are preferably hydraulic drives with continuously variable axial piston pumps, although pumps with bypass valves which can switch from one output setting to another can also be used.

It is preferable for the press control unit to have the ability to control the forward velocity profile as a function of certain process parameters, preferably as a function of the quantity of product present in the pressing space and/or on the type of product, so that an optimal forward velocity profile can be implemented for each pressing cycle.

The press control unit preferably has the ability to control the forward movement of the ram in such a way that the ram, starting from the rear position, moves initially at a first forward velocity to a predetermined first position, in which the pressing space is still only partially filled with product, and then, starting from this first position, moves at a second forward velocity which is lower than the first forward velocity to a second position, in which the product present in the pressing space is subjected to pressure by the ram and liquid phase is squeezed from the product. Filter presses of this type can be realized with low-cost switchable hydraulic drives and can also be realized by modifying existing filter presses by adding a suitable press control unit.

If the press control unit is able to determine in advance the degree to which the pressing space is filled at various positions of the ram and/or to determine the probable position of the ram when the volume of the pressing space becomes equal to the volume of the product in the pressing space, preferably during the forward movement of the ram within the cycle in question, and to configure the forward velocity profile in such a way that the first position is reached a certain distance away from the position of the ram at which the volume of the pressing space is equal to the volume of the product in the pressing space, then it is possible to determine the first position, i.e., the point at which the forward velocity is switched to the lower velocity, just before the ram makes full contact with the product and thus to optimize the output of the press.

It is also advantageous for the press control unit to have the ability, in the second phase of the forward movement, to control the forward movement in such a way that a pressure curve, preferably predetermined as a function of the product to be pressed and/or a pressure curve calculated as a function of the actual juice runoff, can be implemented in the pressing space during the squeezing-out of liquid phase from the product, so that here, too, individual optimization is possible.

In yet another preferred embodiment of the filter press, the press control unit also has the ability to control the supply of product to be squeezed and/or the supply of wash fluid to the pressing space, preferably in an automatic manner, so that the entire operation of the press, starting with the filling step and continuing all the way to the emptying step, can be completely automated.

In still another preferred embodiment, the filter press is built in such a way that it has a plurality of flexible filter drainage elements installed between the ram and the other boundaries of the pressing space to allow the liquid phase of the product to leave the pressing space while simultaneously holding back the solid phase of the product in the pressing space during the pressing cycle. Such presses make it possible to obtain especially high yields, and their output can be increased even more by the use of the invention.

A fourth and last aspect of the invention pertains to the use of the filter press according to the third aspect of the invention for the solid-liquid separation of fruit or vegetable pulps in the food industry. An especially high degree of economic benefit can be obtained here because of the large quantities which are processed.

DETAILED DESCRIPTION OF THE PRESENTLY PREFERRED EMBODIMENTS

Figure 1:
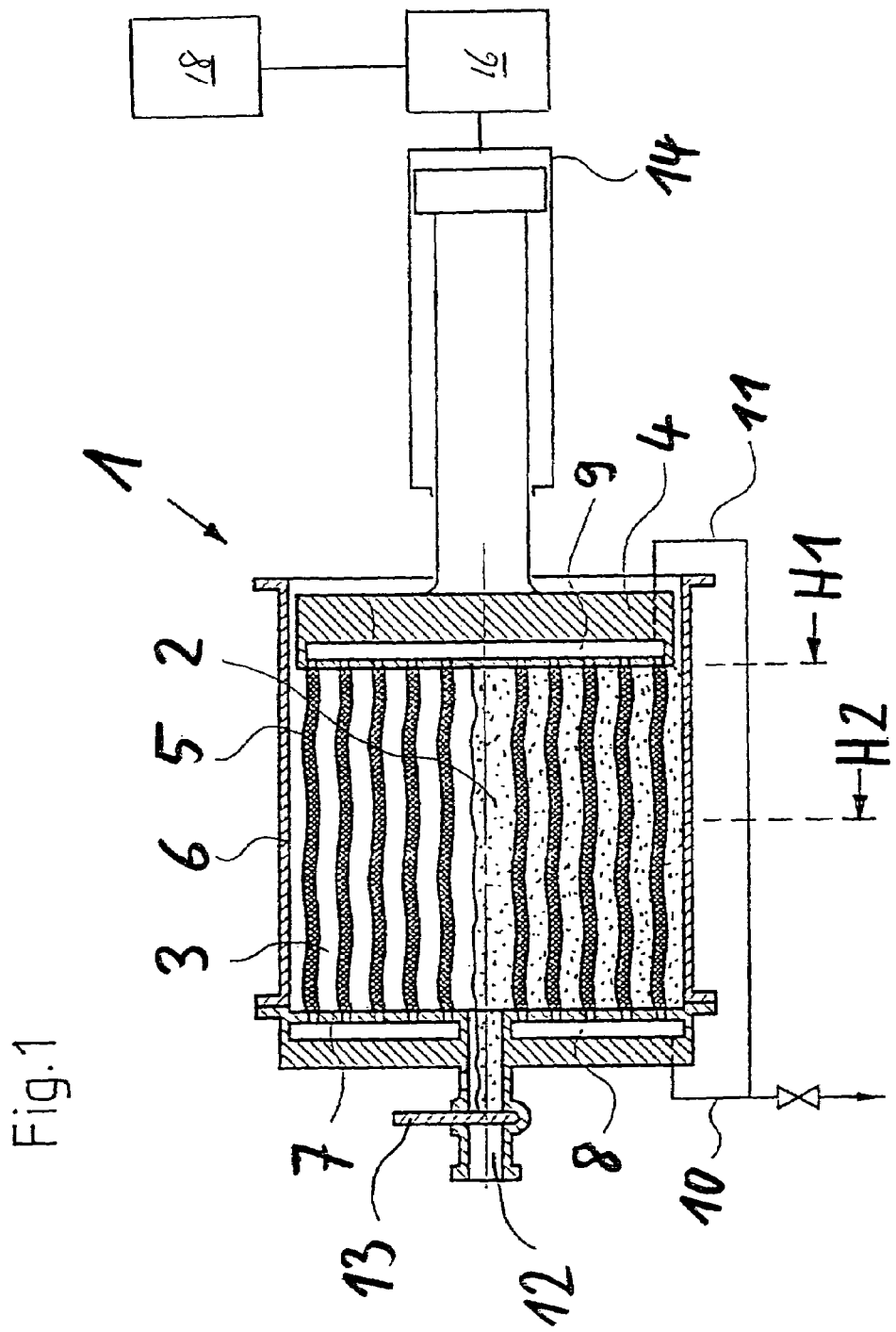
FIG. 1 shows a cross section through a horizontal ram filter press for implementing the inventive method.

A horizontal ram filter press for implementing the inventive method is shown in cross section in FIG. 1. The ram filter press 1 comprises a cylindrical press jacket 6, in which a ram 4 is installed with freedom of horizontal movement. The jacket is closed off at the end opposite the ram end by a pressure plate 7. The press jacket 6, the pressure plate 7, and the ram 4 together form a pressing space 3, which holds the material 2 to be pressed, the volume of which space can be changed by moving the ram 4. Installed between the pressure plate 7 and the ram 4 is a plurality of flexible filter drainage elements 5, which, during the pressing cycle, carry the liquid phase of the material 2 into collecting chambers 8, 9 in the pressure plate 7 and in the ram 4 and from there to runoff lines 10, 11. At the same time, the drainage elements hold back the solid phase in the pressing space 3. The material 2 to be pressed is fed to the pressing space 3 through a central filling opening 12, which, after the material 2 has been introduced, is closed off by a slide 13. The ram 4 is driven by a double-acting hydraulic cylinder 14, which is in working connection with a hydraulic pump 16. In the situation shown here, the ram 4 is located in an appropriate rear position H1, and the pressing space 3 is approximately half-filled with an appropriate fruit pulp 2 as the product.

When, starting from the illustrated situation, the ram 4 is moved toward the left in the direction of the pressure plate 7 by appropriate actuation of the hydraulic cylinder 14, the volume of the pressing space 3 is thus progressively reduced. No significant pressure is built up in the pressing space 3 until the ram 4 makes full contact with the pulp 2 at position H2 as a result of the equality now reached between the volume of the pressing space 3 and the volume of the pulp 2 present in that space. As the ram continues to move forward, the pressure in the pressing space 3 starts to build up and liquid phase begins to run off from the fruit pulp 2 via the filter drainage elements 5 into the runoff lines 10, 11.

FIGS. 2-5 show diagrams of the course of the stroke H of the ram (solid line) and of the pressure P in the pressing space (broken line) versus the time t during the operation of the filter press 1 illustrated in FIG. 1. Several successive pressing cycles separated by phases in which the mixed material is loosened (FIGS. 2-4) or separated by phases in which more material is added in a pulse-like manner (FIG. 5) are shown. As can be seen, the ram 4, which is in position H4 at the end of the preceding pressing cycle, is returned at the beginning of the next pressing cycle to the rear position H1, as a result of which the filter drainage elements 5 in the pressing space 3 are stretched, the volume of the pressing space is simultaneously enlarged, and the pulp 2 in the pressing space 3, the solids content of which has already been increased, is loosened. In the method shown in FIG. 5, furthermore, as previously mentioned, additional pulp 2 is loaded into the pressing space 3 as the ram 4 is retracted.

The ram 4 is now moved forward. In all of the methods shown here, this forward movement begins at the maximum forward velocity and ends at the minimum forward velocity, the various inventive methods shown in FIGS. 2-5 differing from each other with respect to the change over time in this forward movement, i.e., with respect to the forward velocity profiles.

Figure 2:
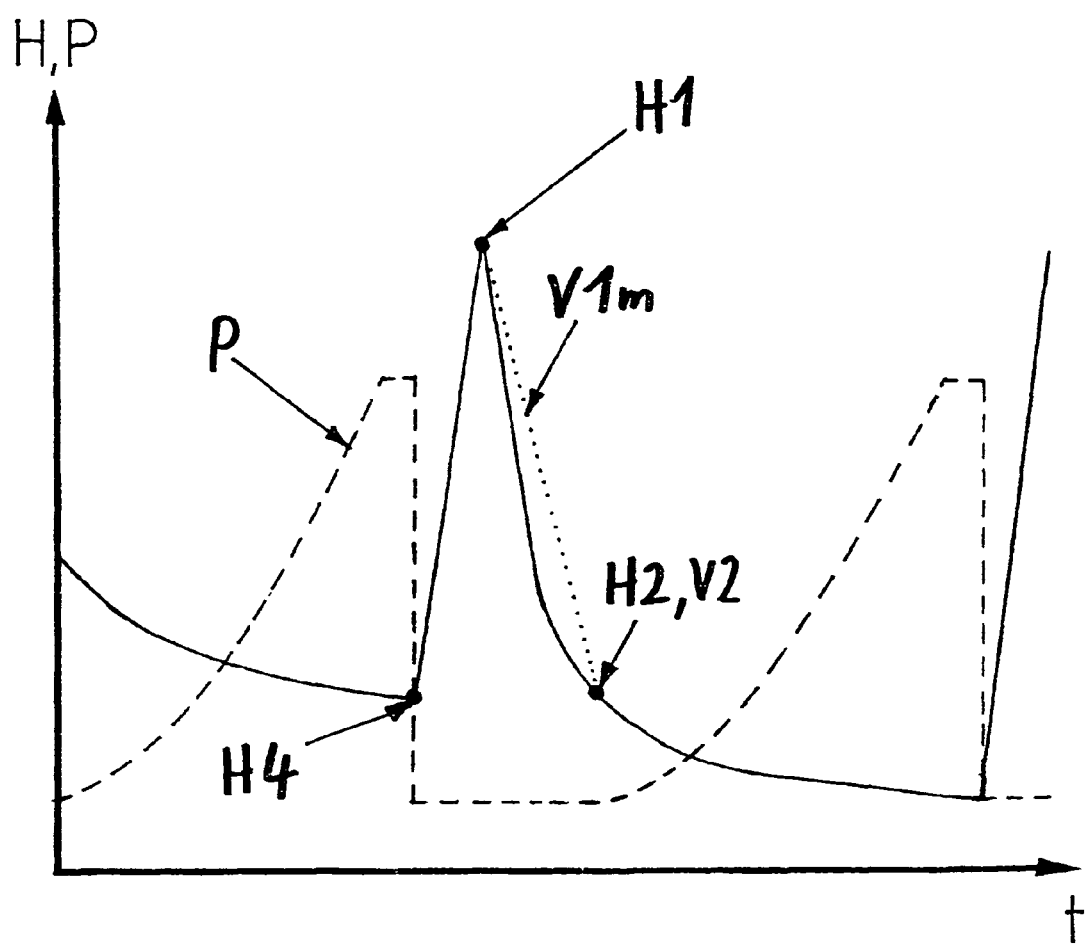
FIG. 2 shows a diagram of the change in the stroke H of the ram and in the pressure P in the pressing space versus the time t during the use of a first inventive method for operating the filter press of FIG. 1.

In the operating method shown in FIG. 2, the entire forward movement of the ram 4 starting from the rear, retracted position H1 and continuing to the end of the forward movement, takes place in accordance with a continuous forward velocity profile, in which the forward velocity decreases gradually with increasing stroke of the ram. When the ram is in position H2, in which it makes full contact with the pulp 2, it has a predetermined forward velocity V2, which is much slower than the average feed velocity V1m at which it traveled the distance from the rear position H1 to the full-contact position H2. The continuous forward velocity profile is realized by the use of a continuously variable axial piston pump, i.e., pump 16, to supply the hydraulic cylinder 14 and by the appropriate actuation of the pump 16 by a computer-controlled press control unit 18. To ensure that the ram 4 always has the predetermined second forward velocity V2 when it makes full contact with the pulp 2, the end position H4 of the ram 4 during the previous pressing cycle is determined. This end position corresponds essentially to the position H2 which the ram 4 will occupy when it makes full contact with the pulp 2 during the following pressing cycle and is used by the press control unit to adjust the forward velocity profile as appropriate. In this way, the forward velocity profile is optimized automatically for each individual pressing cycle.

Figure 3:
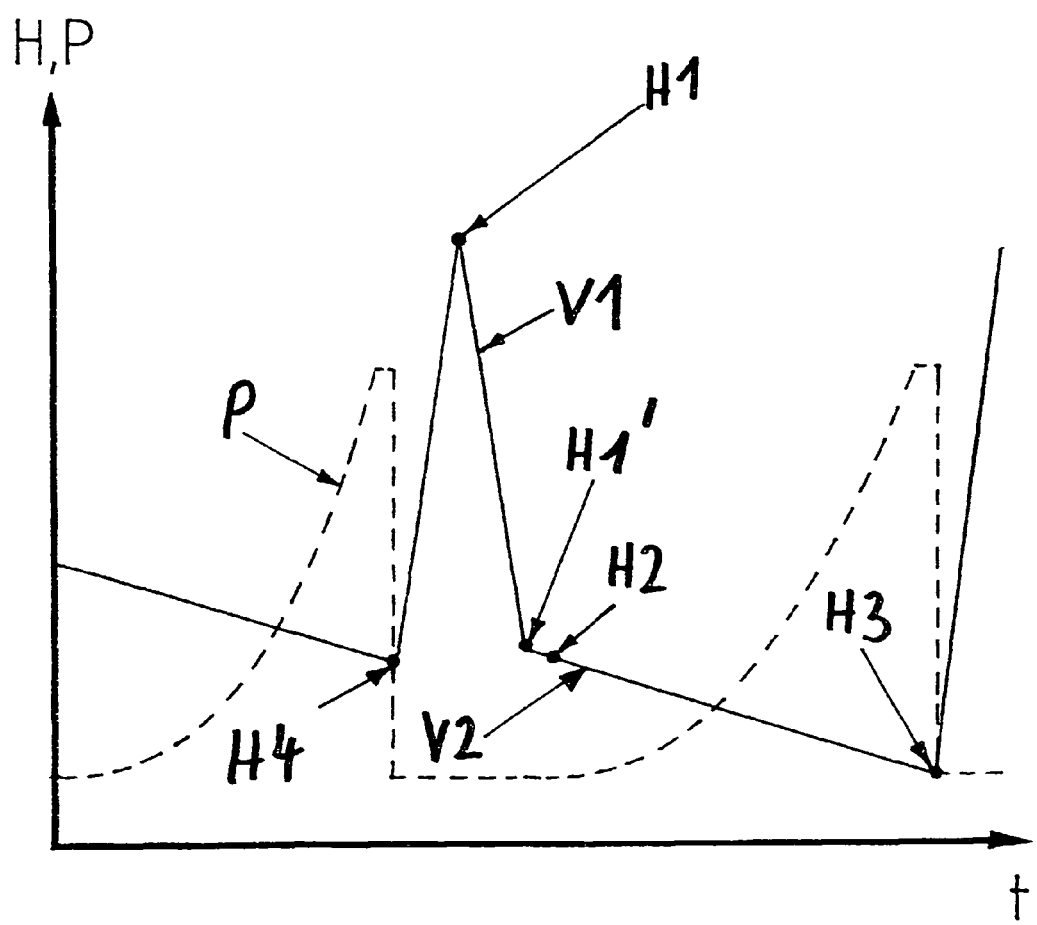
FIG. 3 is a diagram similar to FIG. 2 showing a second inventive operating method.

In the case of the operating method shown in FIG. 3, the forward movement of the ram 4 starting from the rear position Hi proceeds at a first constant forward velocity V1 to a first position H1', which is just in front of position H2 at which the ram 4 makes full contact with the pulp 2. The ram then advances at a second constant forward velocity V2, which is much slower than the first velocity V1, and continues all the way to a second position H3, which corresponds here to the end position of the forward movement of the ram. Thus the ram 4 makes full contact with the pulp 2 at position H2 at the slower velocity V2. The graduated forward velocity profile is realized here by the use of a two-stage switching hydraulic pump as the supply unit for the hydraulic cylinder 14 and by the appropriate switching of the pump at point H1' by the press control unit. Here, too, the press control unit determines the end position H4 of the ram 4 at the end of the preceding pressing cycle, thus establishes the position H2 which the ram 4 will occupy when making full contact with the pulp 2, and then establishes the switching point H1' on the basis of a predefined stroke difference. In this way it can be guaranteed that the switching to the slower forward velocity V2 will always occur at a certain stroke difference before the point at which the ram 4 makes full contact with the pulp 2. In addition to the end position H4 of the ram, the pressure P in the pressing space reached when the ram arrives in that position can also be determined. This pressure value can then also be used to help determine the full-contact position H2 or the switching point H1', e.g., to take into account changes in the compressibility of the pulp over the course of several successive pressing cycles.

Figure 4:
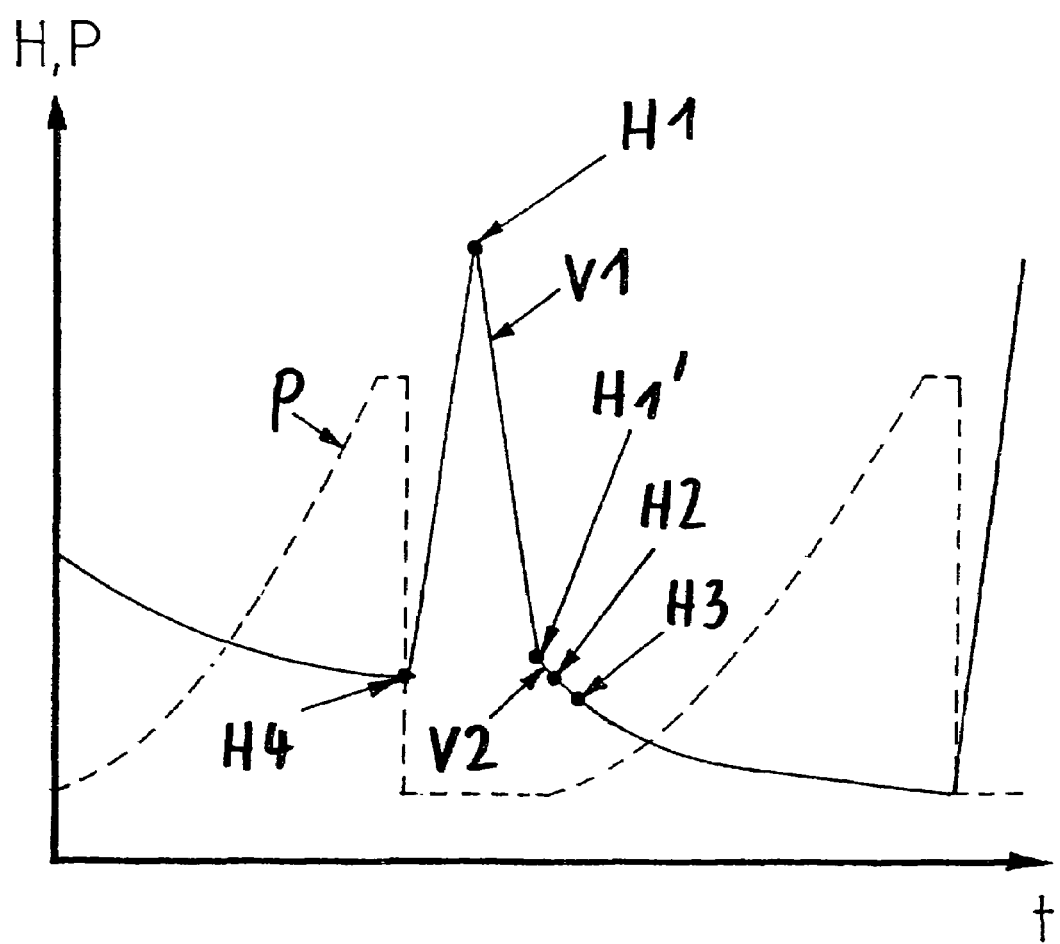
FIG. 4 is a diagram similar to FIG. 2 showing a third inventive operating method.

In the case of the operating method shown in FIG. 4, the forward movement of the ram 4, as also in the method illustrated in FIG. 3, starting from the rear retracted position H1, proceeds at a first, constant forward velocity V1 to a first position H1', which is just in front of the full-contact position H2 of the ram 4 with the pulp 2. After that, the ram advances at a second constant forward velocity V2, much slower than the first velocity V1, to a second position H3, which means that the ram 4 makes full contact with the pulp 2 at the slower velocity V2. In contrast to the method shown in FIG. 3, however, the second position H3, which represents the end of the forward movement of the ram 4 at the second velocity V2, is not at the end of the entire forward movement of the ram 4 but rather between the position H2 at which the ram 4 makes full contact with the pulp 2 and the end of the forward movement. In the present case, the second position H3 is reached when the pressure P in the pressing space exceeds a certain threshold value. When this threshold value is reached, the press control unit switches to a control variant, in which a predetermined pressure curve in the pressing space is implemented by appropriate control of the forward movement of the ram. Instead of the use of a specific pressure threshold, it is also possible to use a certain stroke difference with respect to position H2 as a criterion for the presence of the second position H3 and for the subsequent switchover to pressure control mode.

Figure 5:
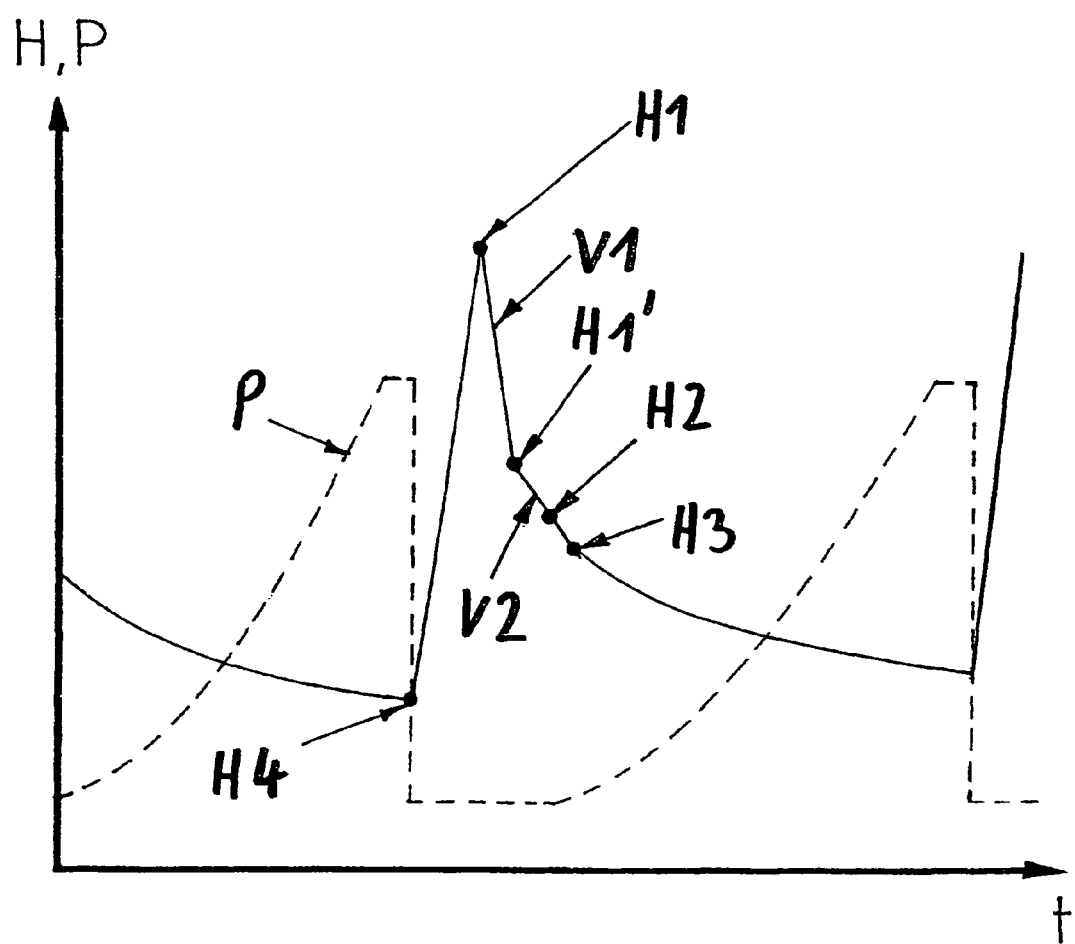
FIG. 5 is a diagram similar to FIG. 2 showing a fourth inventive operating method.

The operating method shown in FIG. 5 differs from that of FIG. 4 only in that, between the end position H4 of the forward movement of the ram in the preceding pressing cycle and the full contact of the ram 4 with the pulp 2 in position H2, additional pulp 2 is added to the pressing space 3, so that the volume of pulp 2 present in the pressing space 3 is increased, and the contact position H2 is situated in front of the earlier ram position H4. So that the position in which the ram 4 will make contact with the pulp 2 and the associated first position H1' can be determined, the press control unit in the present case determines not only the end position H4 of the ram in the preceding pressing cycle but also the additional quantity of pulp 2 supplied.

Whereas preferred embodiments of the invention are described in the present application, it must be pointed out explicitly that the invention is not limited to these embodiments and that the invention can be executed in other ways within the scope of the following claims.

What is claimed is:

1. A method of operating a filter press for solid-liquid separation of a product consisting of a liquid containing solids, the filter press comprising a press jacket, a press plate at one end of the press jacket, a ram in the press jacket and movable relative to the press plate, and a plurality of flexible filter drainage elements installed between the ram and the press plate, the press jacket, the press plate and the ram defining a pressing space having a volume, the method comprising the steps of:

preparing the filter press by loading the product to be pressed in the pressing space and by positioning the ram in a start position where the product only partially fills the pressing space;

advancing the ram, during a first phase of a forward movement of the ram, from the start position to a full contact position which is positioned between the start position and the press plate, wherein the volume of the pressing space becomes equal to a volume of the product in the pressing space at the full contact position, the ram exerting no pressure on the product during the first phase of the forward movement to press liquid phrase out of the product; and advancing the ram, during a second phase of the forward movement, toward the press plate from the full contact position, the ram exerting pressure on the product during the second phase of the forward movement to press liquid phase out of the product, wherein, during the second phase, the ram is advanced from the full contact position at a full contact forward velocity which is lower than an average forward velocity averaged over the first phase of the forward movement, and wherein the first phase begins at a first time point and ends at a second time point when the ram reaches the full contact position, and wherein, beginning at the second time point, the ram is advanced from the full contact position at a full contact forward velocity which is lower than the average forward velocity during the first phase.

2. The method of claim 1, wherein prior to reaching the full contact position, the forward velocity of the ram is reduced graduatedly or continuously from a maximum forward velocity in the first phase of the forward movement to the full contact forward velocity.

3. The method of claim 2, wherein prior to reaching the full contact position, the forward velocity of the ram is reduced graduatedly or continuously according to a predetermined forward velocity profile.

4. The method of claim 3, wherein said step of advancing the ram during the first phase of the forward movement includes initially advancing the ram from the start position at a first forward velocity to a predetermined first position which is before the full contact position but at which the pressing space is still only partially filled by the product, and further advancing the ram, at a second forward velocity which is lower than the first forward velocity, from the first position to a second position which is positioned between the full contact position and the press plate.

5. The method of claim 4, wherein the first position is predetermined so that when the ram reaches the first position, the pressing space is filled to a predetermined degree or the ram is at a predetermined distance away from the full contact position.

6. The method of claim 4, wherein said step of further advancing at the second forward velocity during the second phase of the forward movement is performed until a predetermined pressure is reached in the pressing space.

7. The method of claim 4, further comprising the step of conducting a preceding pressing cycle before said step of advancing the ram during the first phase and predetermining the first position by determining an end position of the ram at the end of said preceding pressing cycle, and also determining a pressure in the pressing space when the ram is in the end position.

8. The method of claim 7, further comprising the step of supplying an additional amount of the product to the pressing space between an end of the preceding pressing cycle and when the ram reaches the full contact position during said step of advancing the ram during a first phase.

9. The method of claim 8, further comprising the step of determining the forward velocity profile and the first position based on the additional amount of the product supplied to the pressing space.

10. The method of claim 7, further comprising the step of supplying an amount of a wash fluid to the pressing space between an end of the preceding pressing cycle and when the ram reaches the full contact position during said step of advancing the ram during a first phase.

11. The method of claim 10, further comprising the step of determining the forward velocity profile and the first position based on the amount of the wash fluid supplied to the pressing space.

12. The method of claim 1, further comprising the step of regulating the forward velocity of the ram during the second phase of the forward movement by implementing a predetermined pressure curve during the pressing out of the liquid phase from the product when the pressure in the pressing space reaches a predetermined value or when the ram reaches a predetermined position.

13. The method of claim 12, wherein the pressure curve is selected as a function of at least one of the product and an effective runoff of the liquid phase.

14. The method of claim 1, further comprising the steps of allowing the liquid phase of the product to leave the pressing space and maintaining the solid phase of the product in the pressing space during a pressing cycle using the filter drainage elements.

15. The method of claim 1, wherein the product to be pressed is fruit pulp or vegetable pulp.

16. A filter press comprising:
a press jacket;
a press plate at one end of the press jacket;
a ram in the press jacket and movable relative to the press plate;
a plurality of flexible filter drainage elements installed between the ram and the press plate, and
a press control unit for controlling movement of the ram relative to the press plate,
wherein the press jacket, the press plate and the ram define a pressing space for holding a product to be pressed, and
wherein the press control unit is configured to advance the ram, during a first phase of a forward movement of the ram, from a start position, where the product only partially fills the pressing space, to a full contact position which is positioned between the start position and the press plate, wherein the volume of the pressing space becomes equal to a volume of the product in the pressing space at the full contact position, the ram exerting no pressure on the product during the first phase of the forward movement to press liquid phrase out of the product; and
the press control unit is configured to advance the ram, during a second phase of the forward movement, toward the press plate from the full contact position, the ram exerting pressure on the product during the second phase of the forward movement to press liquid phase out of the product,
wherein, during the second phase, the ram is advanced from the full contact position at a full contact forward velocity which is lower than an average forward velocity averaged over the first phase of the forward movement, and
wherein the first phase begins at a first time point and ends at a second time point when the ram reaches the full contact position, and wherein, beginning at the second time point, the ram is advanced from the full contact position at a full contact forward velocity which is lower than the average forward velocity during the first phase.

17. The filter press of claim 16, wherein the press control unit is configured to control the forward movement of the ram in accordance with a graduated forward velocity profile or a continuous forward velocity profile.

18. The filter press of claim 17, wherein the graduated forward velocity profile or the continuous forward velocity profile is predetermined as a function of at least one of a quantity of the product in the pressing space and type of the product.

19. The filter press of claim 16, wherein the press control unit is configured to control the forward movement of the ram so that the ram moves initially from the start position at a first forward velocity to a predetermined first position which is in front the full contact position but at which the pressing space is still only partially filled by the product, and so that the ram moves, at a second forward velocity which is lower than the first forward velocity, from the first position to a second position which is positioned between the full contact position and the press plate.

20. The filter press of claim 19, wherein the press control unit is configured to determine in advance at least one of a degree to which the pressing space is filled at various positions of the ram or the full contact position, the press control unit being configured to adjust a forward velocity profile of the ram so that when the ram reaches the first position, the pressing space is filled to a predetermined degree or the ram is at a predetermined distance away from the full contact position.

21. The filter press of claim 16, wherein the press control unit is configured to control the forward movement of the ram during the second phase of the forward movement so that a predetermined pressure curve in the pressing space is implemented during the pressing out of the liquid phase from the product.

22. The filter press of claim 21, wherein the pressure curve is predetermined as a function of the product.

23. The filter press of claim 16, wherein the press control unit is configured to increase pressure in the pressing space as a function of a runoff of the liquid phase.

24. The filter press of claim 16, wherein the press control unit is configured to automatically control at least one of supplying the product to the pressing space and supplying of a wash liquid to the pressing space.

25. The filter press of claim 16, wherein the filter drainage elements allow the liquid phase of the product to leave the pressing space while maintaining a solid phase of the product within the pressing space during a pressing cycle.

26. The filter press of claim 16, wherein the product to be pressed is a mixture of juice and pulp.

* * * * *